United States Patent
Kim (10) Patent No.: US 9,141,129 B2
(45) Date of Patent: Sep. 22, 2015

(54) PEDAL SIMULATOR

(71) Applicant: MANDO CORPORATION, Pyeongtaek-si, Gyeonggi-do (KR)

(72) Inventor: Yoo Sang Kim, Gunpo-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 14/079,341

(22) Filed: Nov. 13, 2013

(65) Prior Publication Data
US 2014/0138888 A1    May 22, 2014

(30) Foreign Application Priority Data

Nov. 19, 2012 (KR) .................. 10-2012-0131128

(51) Int. Cl.
*B60T 8/40* (2006.01)
*G05G 5/03* (2008.04)

(52) U.S. Cl.
CPC . *G05G 5/03* (2013.01); *B60T 8/409* (2013.01); *B60T 8/4081* (2013.01)

(58) Field of Classification Search
CPC .......... G05G 5/03; B60T 8/409; B60T 8/4081
USPC ........... 303/113.4, 115.1; 267/140.13, 85, 33, 267/292, 118, 124; 60/553; 703/7, 8
See application file for complete search history.

(56) References Cited

U.S. PATENT DOCUMENTS

| | | | |
|---|---|---|---|
| 5,180,144 A | 1/1993 | Hellyer et al. | |
| 7,331,641 B2 * | 2/2008 | Kusano | 303/114.1 |
| 8,342,615 B2 * | 1/2013 | Drumm | 303/20 |
| 8,757,734 B2 * | 6/2014 | Toyohira et al. | 303/113.4 |
| 8,850,810 B2 * | 10/2014 | Murayama et al. | 60/553 |
| 8,914,191 B2 * | 12/2014 | Bohn | 701/36 |
| 2002/0140286 A1 * | 10/2002 | Ishimura et al. | 303/155 |
| 2004/0181381 A1 * | 9/2004 | Matsuhashi | 703/7 |
| 2010/0225159 A1 * | 9/2010 | Drumm | 303/20 |
| 2012/0043806 A1 * | 2/2012 | Linkenbach et al. | 303/113.1 |
| 2012/0103452 A1 * | 5/2012 | Toyohira et al. | 138/31 |
| 2014/0069093 A1 * | 3/2014 | Kim | 60/553 |
| 2014/0109565 A1 * | 4/2014 | Chiba et al. | 60/445 |
| 2014/0230429 A1 * | 8/2014 | Kim et al. | 60/553 |
| 2014/0360177 A1 * | 12/2014 | Ryu et al. | 60/556 |
| 2014/0361473 A1 * | 12/2014 | Ryu et al. | 267/140.2 |

FOREIGN PATENT DOCUMENTS

JP  2008-222028 A  9/2008
KR  10-2000-0048717  7/2000

* cited by examiner

*Primary Examiner* — Thomas Irvin
(74) *Attorney, Agent, or Firm* — Lowe Hauptman & Ham, LLP (57) ABSTRACT

Disclosed herein is a pedal simulator. The pedal simulator includes a main housing, a piston provided within the main housing so as to be reciprocally movable in upward and downward directions, an elastic support portion disposed within the main housing to provide elastic force in the upward direction against one piston, and a damper including a first deformation portion and a second deformation portion having a volume greater than the first deformation portion which are vertically disposed within the main housing, the damper being made of an elastic material such that the first and second deformation portions are sequentially compressed and deformed while being pressed by the piston according to downward movement of the piston.

7 Claims, 6 Drawing Sheets

PEDAL SIMULATOR

CROSS-REFERENCE(S) TO RELATED APPLICATIONS

This application claims priority to Korean Patent Application No. 10-2012-0131128, filed on Nov. 19, 2012, the disclosure of which is incorporated herein by reference in its entirety.

BACKGROUND OF THE INVENTION

1. Field of the Invention

Exemplary embodiments of the present invention relate to a pedal simulator capable of allowing a pedal feeling of a brake to be similar to an existing brake system.

2. Description of the Related Art

In general, a brake-by-wire system performs braking of a vehicle in such a manner that, without mechanical connection between a driver and a braking wheel, an electric caliper located at each vehicle wheel receives a signal from an ECU of the brake-by-wire system and catches a disc located at each vehicle wheel.

Since this brake-by-wire system has a pedal effort characteristic as a pedal feeling felt by a driver during pedal operation of a hydraulic brake system mechanically connected, namely a characteristic which may not realize hysteresis depending upon reaction meaning a physical energy loss together with formation of a nonlinear pedal effort mainly caused by input/output characteristics generated from a booster, there is a need for a separate device to provide a driver with a proper pedal feeling.

Such a system is wholly equipped with an electric device capable of identifying pedal operation of a driver, together with, for example, a mechanical device to provide a driver with a proper pedal feeling, and is typically referred to as a pedal simulator.

Such a pedal simulator is aimed principally at providing a pedal feeling similar to an existing brake system.

Korean Unexamined Patent Application Publication No. 10-2000-0048717 discloses a pedal simulator as a specific example of the conventional pedal simulator.

The pedal simulator buffers therein a piston using one coil spring as a buffer member. However, there is a problem in that such a single buffer member simply indicates a pedal feeling of a brake only as a one-stage linear form.

To improve this, there has been proposed a pedal simulator structure of realizing a nonlinear pedal feeling by applying a plurality of springs and a plurality of dampers corresponding thereto. However, this pedal simulator structure has many problems such as complexity of the structure, an increase of manufacturing costs, and the like.

SUMMARY OF THE INVENTION

An object of the present invention is to provide a pedal simulator capable of realizing a nonlinear pedal feeling by means of one damper and of not generating a different sense due to contact between members during operation of a piston.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a pedal simulator includes a main housing, a piston provided within the main housing so as to be reciprocally movable in upward and downward directions, an elastic support portion disposed within the main housing to provide elastic force in the upward direction against the piston, and a damper including a first deformation portion and a second deformation portion having a volume greater than the first deformation portion which are vertically disposed within the main housing, the damper being made of an elastic material such that the first and second deformation portions are sequentially compressed and deformed while being pressed by the piston according to downward movement of the piston.

In the pedal simulator according to an embodiment of the present invention, the elastic support portion may include a first coil spring which is supported, at an upper end thereof, by one side of the piston and generates elastic force by being compressed according to downward movement of the piston, a support member which is disposed beneath the first coil spring and downwardly moves along with the piston according to downward movement of the piston, the support member being formed, at a center thereof, with a through hole through which an upper end portion of the first deformation passes, and a second coil spring which is disposed beneath the support member and supported by a lower surface of the support member, the second coil spring generating elastic force by being compressed according to downward movement of the support member.

In the pedal simulator according to an embodiment of the present invention, the second coil spring may have a spring constant greater than the first coil spring.

In the pedal simulator according to an embodiment of the present invention, the damper may be formed in a shape having a cross-sectional area increased gradually from an upper end thereof to a lower end thereof.

In the pedal simulator according to an embodiment of the present invention, a damper housing may be fixed to a lower portion of the main housing, and the damper may be inserted and coupled, at a lower end portion thereof, into a groove portion formed in the damper housing.

In the pedal simulator according to an embodiment of the present invention, the damper may be formed, at an outside surface thereof, with a protrusion portion which protrudes outwardly and is made of an elastic material. In this case, a lower surface of the protrusion portion may face an upper surface of the damper housing.

In the pedal simulator according to an embodiment of the present invention, a groove may be formed on any one or both of outer peripheral surfaces of the first and second deformation portions.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

Figure 1:
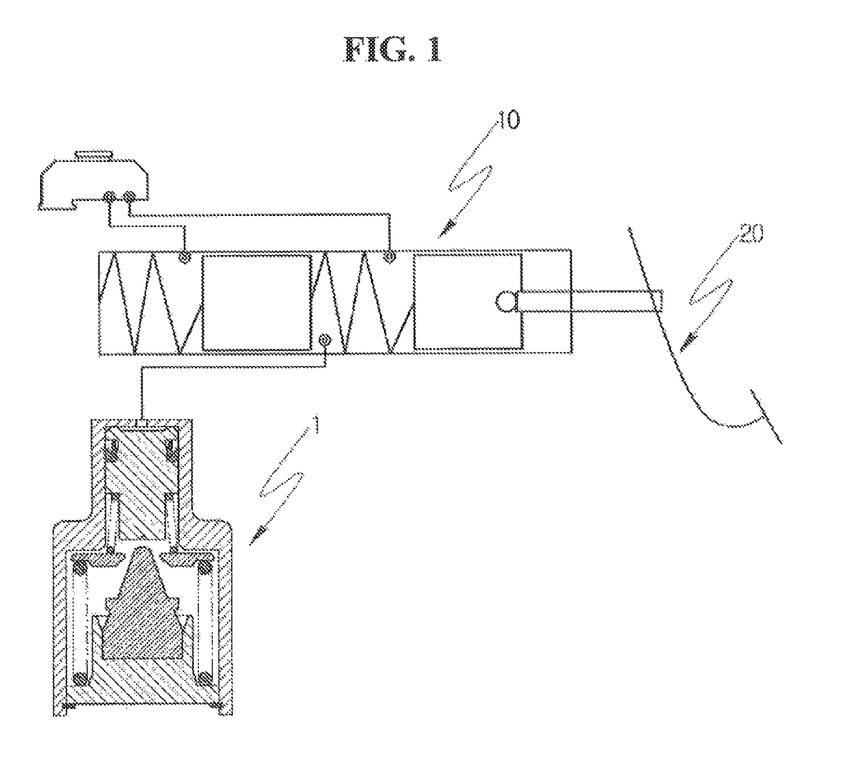
FIG. 1 is a diagram schematically illustrating a brake system including a pedal simulator according to an embodiment of the present invention.
Figure 2:
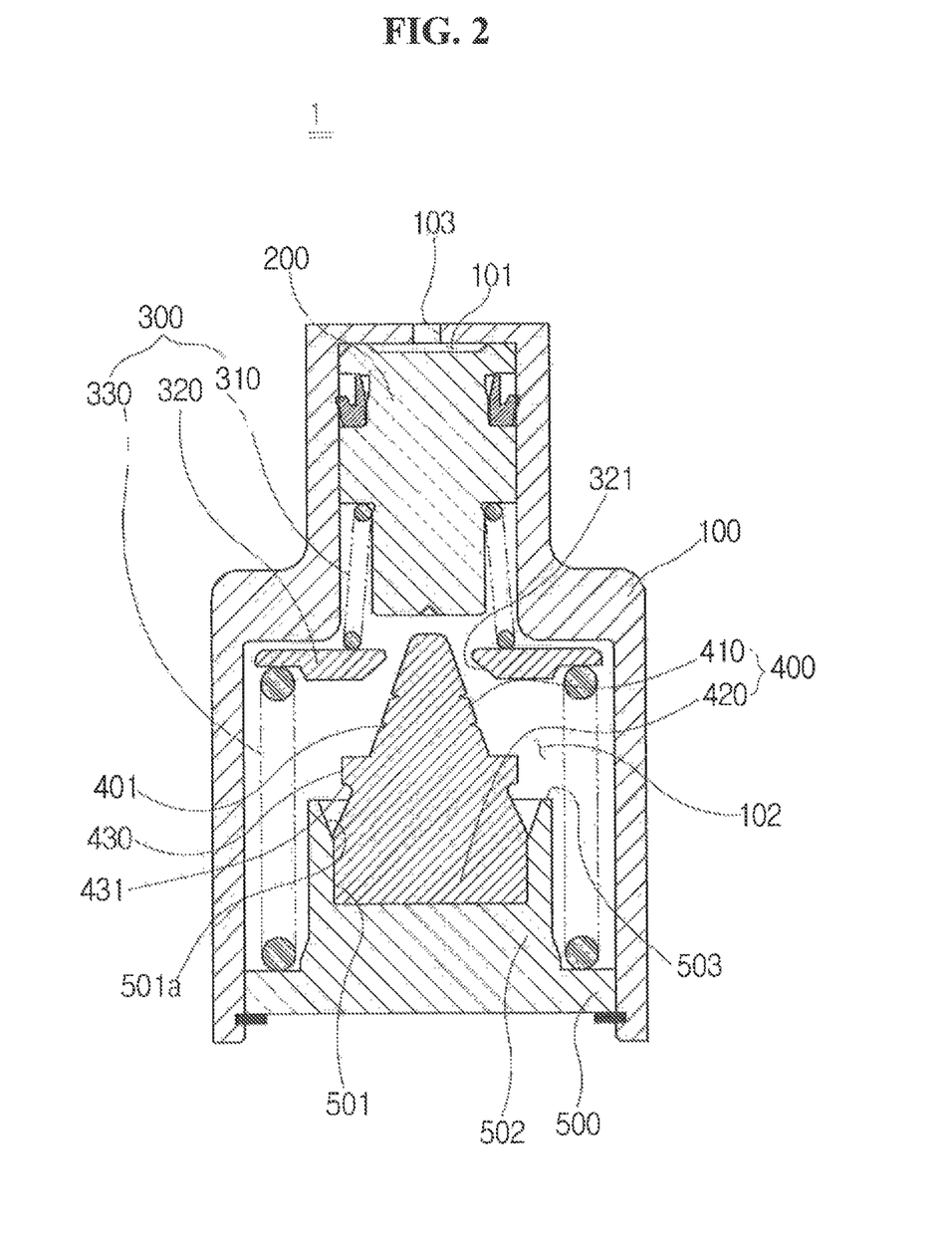
FIG. 2 is a cross-sectional view illustrating the pedal simulator shown in FIG. 1.

FIG. 1 is a diagram schematically illustrating a brake system including a pedal simulator according to an embodiment of the present invention. FIG. 2 is a cross-sectional view illustrating the pedal simulator shown in FIG. 1. FIGS. 3 to 6 are operational views illustrating an operation state of the pedal simulator shown in FIG. 2.

As shown in FIGS. 1 and 2, the pedal simulator 1 according to an embodiment of the present invention includes a main housing 100, a piston 200 provided within the main housing 100 so as to be reciprocally movable in upward and downward directions, an elastic support portion 300 disposed within she main housing 100 to provide elastic force in the upward direction against the piston 200, and a damper 400 that includes a first deformation portion 410 and a second deformation portion 420 having a volume greater than the first deformation portion 410 which are vertically disposed within the main housing 100, and is made of an elastic material such that the first and second deformation portions 410 and 420 are sequentially compressed and deformed while being pressed by the piston 200 according to downward movement of the piston 200.

The pedal simulator 1 according to the present embodiment is connected to a master cylinder 10 included in the brake system, as shown in FIG. 1. In FIG. 1, reference numeral 20 refers to a brake pedal connected to the master cylinder 10.

In detail, the main housing 100 of the present embodiment is connected to the master cylinder 10 and is supplied with hydraulic working oil from the master cylinder 10. One side of the main housing 100 is formed with a working oil supply hole 103 in order to be supplied with the hydraulic working oil.

The main housing 100 has a space defined therein. In more detail, the space defined in the main housing 100 may include a first space 101 in which the piston 200 to be described later reciprocally moves and a second space 102 in which the damper 400 to be described later is disposed.

As shown in the drawing, the first space 101 is defined at an upper side in the inside of the main housing 100 and the second space 102 is defined at a lower side in the inside of the main housing 100. The above-mentioned working oil supply hole 103 is formed at an upper end portion of the main housing 100 so as to communicate with the first space 101.

The piston 200 is configured so as to be reciprocally movable in the upward and downward directions in the first space 101. The piston 200 moves downwardly along the first space 101 while being pressed by the working oil supplied through the working oil supply hole 103.

The elastic support portion 300 serves to provide elastic force in the upward direction against the piston 200. The elastic support portion 300 is operated so as to provide a certain pedal effort when a driver steps on the brake pedal 20.

In detail, the elastic support portion 300 may include a first coil spring 310, a second coil spring 330, and a support member 320 interposed between the first and second coil springs 310 and 330.

The first coil spring 310 may be supported, at an upper end thereof, by one side of the piston 200, and may be supported, at a lower end thereof, by an upper surface of the support member 320. In addition, although not shown, the first coil spring 310 may be supported by being fixed inside the main housing 100.

The support member 320 is disposed beneath the first coil spring 310 and is configured so as to be movable in the upward and downward directions in the second space 102. The support member 320 may be, for example, a circular disc, and be formed, at a center thereof, with a through hole 321 through which an upper end portion of the damper to be described later passes.

A lower one portion of the piston 200 comes into contact with the upper surface of the support member 320 as the piston 200 moves downwardly. The support member 320 moves downwardly along with the piston 200 as the piston 200 continues to move downwardly.

In the support member 320 described above, the lower end of the first coil spring 310 may be supported by the upper surface of the support member 320. In this case, the first coil spring 310 generates elastic force while being compressed according to downward movement of the piston 200, the elastic force serves as external force applied in the upward direction against the piston 200.

In addition, the elastic force may also serve as external force applied in the downward direction against the support member 320. However, when the second coil spring 330 to be described later has a spring constant greater than the first coil spring 310, elastic force generated by the first coil spring 310 does not contribute to or contributes little to downward movement of the support member 320. In this case, the downward movement of the support member 320 is actually realized by pressing of the piston 200 according to she downward movement of the piston 200.

The second coil spring 330 may be provided beneath the support member 320. The second coil spring 330 may be supported, at an upper end thereof, by a lower surface of the support member 320, and may be supported, at a lower end thereof, by being fixed inside the main housing 100 or by a flange portion 502 of a damper housing 500 as shown in the drawing.

The second coil spring 330 generates elastic force while being compressed when the support member 320 moves downwardly by pressing of the piston 200, and the elastic force serves as external force applied in the upward direction against the support member 320 and the piston 200.

The second coil spring 330 may have a spring constant greater than the first coil spring 310. In this case, the piston 200 is before coming into contact with the support member 320. Accordingly, compared with the piston 200 compressing the first coil spring 310 only, a greater pedal effort is required for the brake pedal 20 at the time when the piston 200 presses and downwardly moves the support member 320.

Accordingly, the pedal simulator 1 according to the present embodiment functions to have a nonlinear pedal effort characteristic for the brake pedal 20 by the elastic support portion 300 including the first coil spring 310, the support member 320, and the second coil spring 330.

Meanwhile, the pedal simulator 1 according to the present embodiment includes the damper 400 in order for the pedal effort characteristic for the brake pedal 20 to be closer to a vehicle to which a conventional brake system is applied.

The damper 400 may be disposed in the second space 102 among the inner spaces of the main housing 100. In this case, the damper 400 may be arranged so as to be coupled to the damper housing 500 fixed in the second space 102 of the main housing 100.

The damper housing 500 may be formed, at an upper side thereof, with a groove portion 501 such that the damper 400 is coupled into the groove portion 501. The damper housing 500 may be formed, at a lower end portion thereof, with the flange portion 502, and the lower end of the second coil spring 330 may be supported by the upper surface of the flange portion 502.

The lower end portion of the damper 400 may be inserted and coupled into the groove portion 501 of the damper housing 500. In such a coupled state, the damper 400 is disposed in the second space 102 while facing the piston 200 disposed in the first space 101 in the upward and downward directions.

The damper 400 may be made of an elastic material, which is elastically deformable, for example, a material such as rubber. The damper 400 may be elastically compressed and deformed by pressing of the piston 200, thereby generating elastic force. Since the elastic force serves as external force applied in the upward direction against the piston 200, the piston 200 has to move downwardly by greater force in order to compress and deform the damper 400.

The damper 400 may include a first deformation portion 410 and a second deformation portion 420 which are arranged in the upward and downward directions. In this case, the first deformation portion 410 may have a volume smaller than the second deformation portion 420. Accordingly, the first deformation portion 410 has an amount of compressive deformation in the downward direction different from the second deformation portion 420 with respect to the same pressing force. That is, the first deformation portion 410 has an amount of compressive deformation in the downward direction greater than the second deformation portion 420.

As a specific example of the damper 400, there is presented a damper 400 which has an intermediate shape of a substantial semi-spherical shape and a conical shape and a cross-sectional area increased gradually from the upper portion thereof to the lower portion thereof.

When the damper 400 has a shape described above, the upper volume of the damper 400 is smaller than the lower volume thereof. Accordingly, when pressing force is applied in the upward and downward directions, the upper portion of the damper 400 has an amount of compressive deformation in the downward direction greater than the lower portion thereof.

In such a damper 400, the upper portion of the damper 400 serves as the first deformation portion 410 and the lower portion of the damper 400 serves as the second deformation portion 420.

The damper 400 is not limited as to having a shape as shown in the drawings. The damper 400 may be formed in a variety of shapes including the first deformation portion 410 and the second deformation portion 420 which hove volumes different from each other.

In an initial state of the pedal simulator 1, the damper 400 may be arranged such that the upper end portion of the damper 400, particularly the upper end portion of the first deformation portion 410 passes through the through hole 321 formed at the support member 320 and protrudes upward of the support member 320. In this case, the piston 200 first comes into contact with the upper end portion of the damper 400 prior to coming into contact with she support member 320 during downward movement. The damper 400 is pressed downwardly as the piston 200 continues to move downwardly, with the consequence that the first deformation portion 410 is compressed and deformed.

When the piston 200 continues to move downwardly, next to the first deformation portion 410, the second deformation portion 420 is compressed and deformed. Accordingly, a greater pedal effort is required for the brake pedal 20 at the time when the second deformation 420 is compressed and deformed, compared with at the time of deformation of the first deformation portion 410.

Since the damper 400 includes the first and second deformation portions 410 and 420 as described above, the pedal simulator 1 according to the present embodiment may be operated such that a nonlinear pedal effort characteristic is realized.

Meanwhile, point of time for compressive deformation of the first and second deformation portions 410 and 420 according to the above description may be construed as being apparently divided in time, though not necessary.

In practice, a certain pressing force may be transferred to the second deformation portion 420 during deformation of the first deformation portion 410. In this case, the second deformation portion 420 may also be deformed together during compressive deformation of the first deformation portion 410.

However, at this time, an amount of deformation of the second deformation portion 420 is not high. Since the second deformation portion 420 is actually compressed and deformed after the first deformation portion 410 is sufficiently compressed and deformed, the above description in which the second deformation portion 420 is compressed and deformed next to the first deformation portion 410 may be construed so as to encompass the above-mentioned practical deformation course.

In addition, the damper 400 is not limited as to being configured of only the first and second deformation portions 410 and 420. In other words, in realization of a nonlinear pedal feeling, the damper 400 may not realize only a two-stage nonlinear pedal feeling, considering operation of the damper 400.

The damper 400 may be configured of deformation portions which are more subdivided, and thus may also realize a multi-stage or continuous nonlinear pedal feeling.

Meanwhile, the damper 400 may perform a function capable of not generating a different sense caused by contact with the other members of the piston 200 according to downward movement of the piston 200, besides contributing to realization of the nonlinear pedal feeling.

Here, "different sense" means fine impact or the like caused by contact with the other members of the piston 200 and felt by a driver when the driver steps on the brake pedal 20.

Specifically, the piston 200 comes into contact with the support member 320 according to downward movement of the piston 200 as described above. In this case, the piston 200 and the support member 320 may be made of, for example, a metallic material so as to have durability. In this case, the above-mentioned different sense may be generated during contact of the piston 200 and the support member 320.

However, when the upper end portion of the damper 400 protrudes upward of the support member 320, the piston 200 comes into contact with the support member 320 during compressive deformation of the first deformation portion 410. Accordingly, the above-mentioned different sense caused by contact of the piston 200 and the support member 320 may not be generated or may be minimized due to buffer action by the first deformation portion 410.

Meanwhile, the lower surface of the support member 320 may come into contact with the upper surface 503 of the damper housing 500 in the course of the support member 320 moving downwardly along with the piston 200. In this case, since the damper housing 500 is fixed inside the main housing 100, the support member 320 may be limited as to downward movement by contact with the upper surface 503 of the damper housing 500. In other words, the upper end portion of the damper housing 500 may serve as a stopper to limit downward movement of the piston 200.

The above-mentioned different sense may be generated even when the support member 320 comes into contact with the upper surface 503 of the damper housing 500. In order to eliminate the different sense, the damper 400 may be formed with a protrusion portion 430 protruding from an outside surface thereof to the outside.

In this case, the protrusion portion 430 may be formed such that a lower surface 431 of the protrusion portion 430 faces the upper surface 503 of the damper housing 500. The protrusion portion 430 may made of an elastic material such as rubber. When the damper 400 is made of the above-mentioned elastic material, the protrusion portion 430 may formed integrally with the damper 400.

By forming the protrusion portion 430 in the damper 400, the protrusion portion 430 is interposed between the rower surface of the support member 320 and the upper surface 503 of the damper housing 500, so that the different sense is not generated by buffer action of the protrusion portion 430.

Meanwhile, a function of the protrusion portion 430 to attenuate the different sense does not achieve only in a case in which the pedal simulator 1 according to the present embodiment includes the support member 320.

As described above, the protrusion portion 430 is formed such that the lower surface 431 of the protrusion portion 430 faces the upper surface 503 of the damper housing 500. Accordingly, the above-mentioned function may be performed even when the piston 200 itself comes into contact with the upper surface 503 of the damper housing 500 by other components operatively moving according to downward movement of the piston 200 or structural deformation.

The damper 400 may be formed with a groove 401 such that an amount of deformation of the damper 400 may be adjusted considering characteristics of a material related to an amount of deformation. The groove 401 may be formed on any one or both of outer peripheral surfaces of the first and second deformation portions 410 and 420.

The groove 401 is not limited in shape. For example, the groove 401 may be formed to have a predetermined length in a lateral direction. The groove 401 is not limited in number. For example, the groove 401 may be configured of a plurality of grooves which are spaced apart from each other in the upward and downward directions, as shown in the drawings.

When the groove 401 is formed, the pressing force of the piston 200 required for compressive deformation of the damper 400 may be slightly reduced. By forming the groove 401 in the damper 400, a pedal effort required for the brake pedal 20 may be adjusted properly.

Meanwhile, an inclined surface 501a having an inner diameter increased gradually in the upward direction may also be formed on an inner peripheral surface of the upper end of the groove portion 501 of the damper housing 500 so as not to generate permanent shape deformation of damper 400 due to a contact part of the damper 400 and the damper housing 500 during compressive deformation of the damper 400.

Hereinafter, the specific operation course of the pedal simulator 1 according to the above-mentioned embodiment will be described with reference to FIGS. 2 to 6.

First, FIG. 2 shows an initial state of the pedal simulator 1. This is a state before working oil begins to be supplied through the working oil supply hole 103, and the piston 200 is disposed at the upper side in the first space 101.

In this state, when a driver steps on the brake pedal 20 (see FIG. 1), hydraulic pressure is generated by the master cylinder 10 (see FIG. 1). This hydraulic pressure is transferred into the main housing 100 while working oil is introduced into the first space 101 through the supply hole 103.

The hydraulic pressure is transferred to the first space 101, so that the piston 200 moves downwardly as shown in FIGS. 3 to 6.

Figure 3:
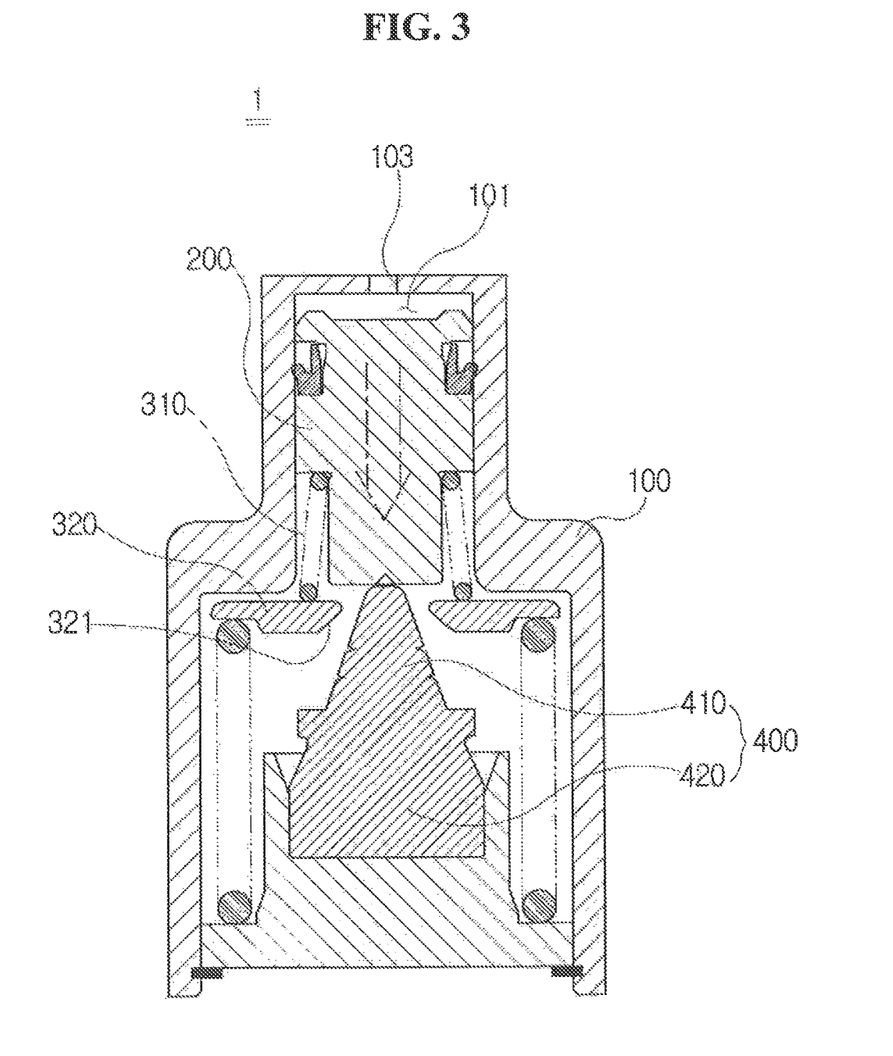
FIGS. 3 to 6 are operational views illustrating an operation state of the pedal simulator shown in FIG. 2.

The piston 200 moving downwardly first compress the first coil spring 310 as shown in FIG. 3. Next, the lower end portion of the piston 200 comes into contact with the upper end portion of the damper 400, namely the upper end portion of the first deformation portion 410, protruding upward of the support member 320 through the through hole 321 of the support member 320.

Figure 4:
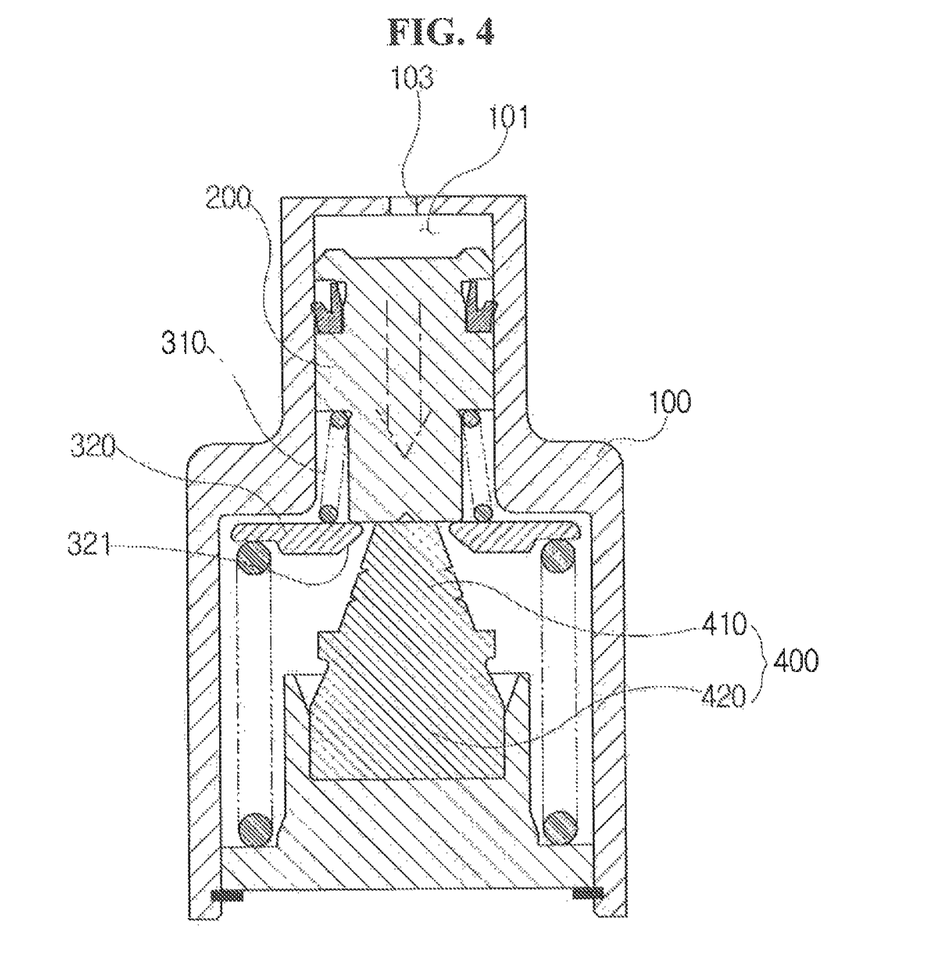

The piston 200 compresses and deforms the first deformation portion 410 while continuing to move downwardly, as shown in FIG. 4. In this course, the resultant force of elastic force of the first coil spring 310 and elastic force generated by compressive deformation of the first deformation portion 410 acts on the piston 200. The magnitude of the elastic force acting on the piston 200 varies from at the time when the piston 200 comes into contact with the first deformation portion 410, thereby generating a first nonlinear pedal effort characteristic. In order for variation in such a characteristic to be generated at the proper time, the distance between the lower surface of the piston 200 and the upper surface of the first deformation portion 410 may be adjusted properly. For example, the distance between the lower surface of the piston 200 and the upper surface of the first deformation portion 410 may be designed so as to be closer, in order for variation in pedal effort characteristic to be generated earlier.

Figure 5:
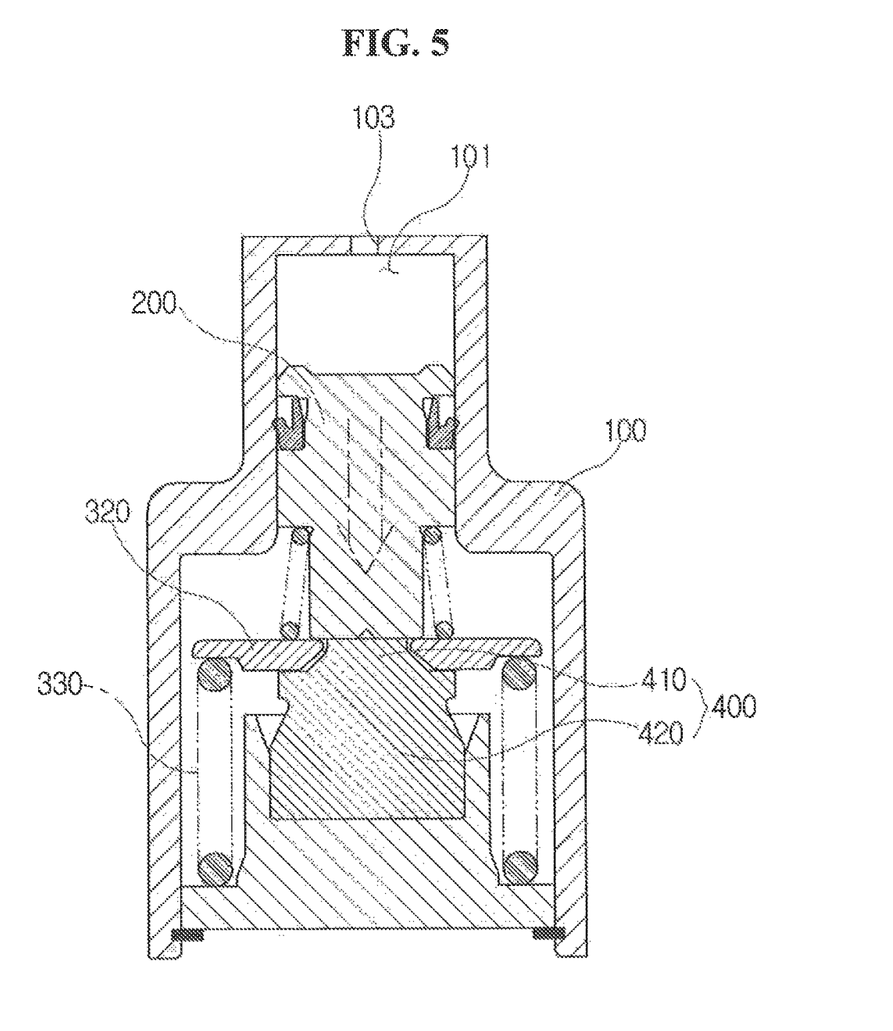

The lower end portion of the piston 200 comes into contact with the upper surface of the support member 320 in the course of the piston 200 compressing and deforming the first deformation portion 410. The support member 320 moves downwardly together with the piston 200 while the piston 200 continues to move downwardly in a state of coming into contact with the upper surface of the support member 320. As shown in FIG. 5, the support member 320 moves downwardly against the elastic force of the second coil spring 330. In this case, the elastic force of the second coil spring 330 acts on the piston 200 together with the above-mentioned resultant force.

Figure 6:
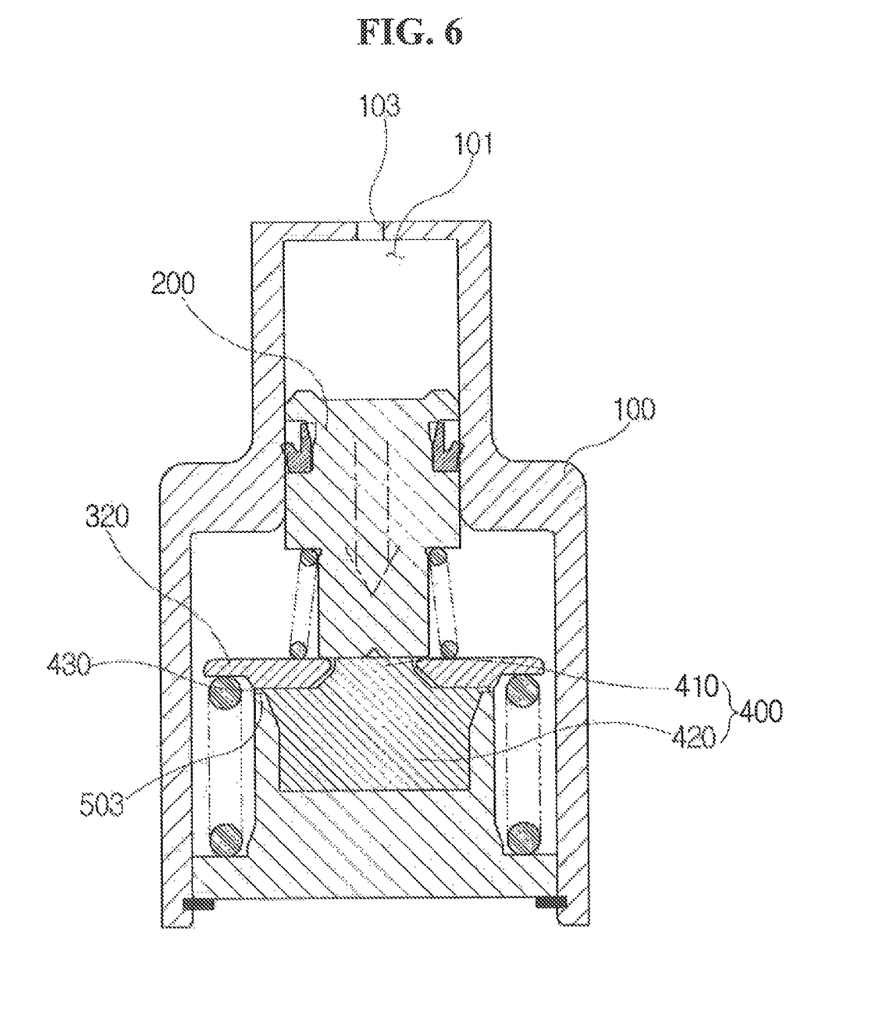

When the first deformation portion 410 is sufficiently compressed and deformed according to continuously downward movement of the piston 200, next to the first deformation portion 410, the second deformation portion 420 is compressed and deformed, as shown in FIG. 6. In this case, in a state as shown in FIG. 5, in addition to force acting on she piston 200, the elastic force of the second deformation portion 420 acts on the piston 200 together. In this case, the protrusion portion 430 performs a buffer function in a state of being interposed between the rower surface of the support member 320 and the upper surface 503 of the damper housing 500, as shown in the drawing.

The pedal simulator 1 according to the present embodiment includes the elastic support portion 300 and the damper 400 including the first and second deformation portions 410 and 420, thereby generating elastic force which gradationally and increasingly acts on the piston 200 during downward movement of the piston 200. Consequently, the pedal effort characteristic for the brake pedal 20 may be nonlinearly realized, and it may be possible so obtain a pedal feeling similar to a vehicle to which a conventional brake system is applied.

As is apparent from the above description, in accordance with the present invention, a nonlinear pedal feeling may be realized by a damper including a first deformation portion and a second deformation portion having an amount of compressive deformation different from each other, together with an elastic support portion. In addition, since the nonlinear pedal feeling is realized by one damper, it may be possible to achieve a simplified structure and a reduction in manufacturing costs.

In addition, a different sense which may be caused during downward movement of a piston may not be generated due to features such as a shape and an arranged position of the damper.

While the present invention has been described with respect to the specific embodiments, it will be apparent to those skilled in the art that various changes and modifications may be made without departing from the spirit and scope of the invention as defined in the following claims.

What is claimed is:

1. A pedal simulator, comprising:
   a main housing;
   a piston provided within the main housing so as to be reciprocally movable in upward and downward directions;
   a damper vertically disposed within the main housing,
   a first coil spring which supports, at an upper end thereof, the piston and which is configured to generate elastic force when being compressed according to downward movement of the piston;
   a support member which is disposed beneath the first coil spring and downwardly moveable with the piston according to downward movement of the piston, the support member having, at a center thereof, a through hole through which the damper passes;
   a second coil spring which is disposed beneath the support member and supports the support member, the second coil spring configured to generate elastic force when being compressed according to downward movement of the support member;
   a damper housing fixed to a lower portion of the main housing,
   wherein the damper is inserted and coupled, at a lower side thereof, into a groove portion formed in the damper housing, and
   wherein the damper has, at an outside surface thereof, a protrusion portion which protrudes outwardly and is made of an elastic material.

2. The pedal simulator according to claim 1, wherein the second coil spring has a spring constant greater than the first coil spring.

3. The pedal simulator according to claim 1, wherein the damper has a cross-sectional area increased gradually from an upper portion of the damper to a lower portion of the damper, the upper portion of the damper being on an upper side of the support member and the lower portion of the damper being on an opposite, lower side of the support member.

4. The pedal simulator according to claim 1, wherein the damper comprises an upper deformation portion and a lower deformation portion having a volume greater than the upper deformation portion.

5. The pedal simulator according to claim 4, wherein a groove is formed on any one or both of outer peripheral surfaces of the upper and lower deformation portions.

6. The pedal simulator according to claim 1, wherein the protrusion portion is between the support member and the damper housing.

7. The pedal simulator according to claim 1, wherein the protrusion portion performs a buffer function in a state of being interposed between the lower surface of the support member and the upper surface of the damper housing.

\* \* \* \* \*